US009706267B2

(12) United States Patent
Sabata et al.

(10) Patent No.: US 9,706,267 B2
(45) Date of Patent: Jul. 11, 2017

(54) ICELSIUS WIRELESS: WIRELESS MONITORING WITH SMART PHONES AND TABLETS

(71) Applicants: Ashok Sabata, Freehold, NJ (US);
Karl Baumgartner, Freehold, NJ (US);
Thierry Jayet, Freehold, NJ (US)

(72) Inventors: Ashok Sabata, Freehold, NJ (US);
Karl Baumgartner, Freehold, NJ (US);
Thierry Jayet, Freehold, NJ (US)

(73) Assignee: AGINOVA INC., Freehold, NJ (US)

( * ) Notice: Subject to any disclaimer, the term of this patent is extended or adjusted under 35 U.S.C. 154(b) by 0 days.

(21) Appl. No.: 13/867,775

(22) Filed: Apr. 22, 2013

(65) Prior Publication Data
US 2014/0313048 A1 Oct. 23, 2014

(51) Int. Cl.
G08C 17/02 (2006.01)
H04Q 9/00 (2006.01)

(52) U.S. Cl.
CPC .......... H04Q 9/00 (2013.01); G08C 2201/93 (2013.01); H04Q 2209/43 (2013.01)

(58) Field of Classification Search
CPC ....... G08C 17/02; G06F 19/3418; A61B 5/11; A61B 5/01; G05B 1/01; H04Q 9/00
USPC ............. 340/856.3, 870.17, 426.24, 426.25, 340/539.22, 539.26, 545.2
See application file for complete search history.

(56) References Cited

U.S. PATENT DOCUMENTS

| 7,154,398 B2* | 12/2006 | Chen et al. ................ 340/573.1 |
| 2003/0216663 A1* | 11/2003 | Jersey-Willuhn et al. ... 600/547 |
| 2003/0234730 A1* | 12/2003 | Arms ...................... H02J 17/00 340/870.01 |
| 2004/0186739 A1* | 9/2004 | Bolles .............. G08B 13/19656 340/506 |
| 2004/0221043 A1* | 11/2004 | Su .......................... H04L 12/18 709/227 |
| 2005/0057370 A1* | 3/2005 | Warrior ............. H04B 7/18506 340/870.01 |
| 2005/0152305 A1* | 7/2005 | Ji ........................... H04L 45/54 370/328 |
| 2005/0219045 A1* | 10/2005 | Ito ....................... G08B 29/145 340/506 |
| 2006/0191318 A1* | 8/2006 | McBride ........... G01N 33/0009 73/23.2 |
| 2008/0024010 A1* | 1/2008 | Romano ................. H02J 9/02 307/66 |

(Continued)

Primary Examiner — Yong Hang Jiang

(57) ABSTRACT

Home use of sensors has been limited to rudimentary devices such as using a thermometer or sensors installed in homes by third party for security. An affordable sensor with advanced capabilities as used in commercial applications has not been possible. Smartphone or smart tablets, with advanced computing ability, has not been a platform for sensor communications though the capability exists. Recent products such as the iCelsius convert the iPhone into a data logger for measuring temperature and relative humidity. However, these sensors are tethered to the device and not wireless. A cost effective sensor solution for consumer application with remote monitoring capability is now possible using WiFi based wireless sensors that will work with the smart phones and the cloud based computing on the internet; such an integration of these three platforms in such a way that the user does not have to intervene to make it all work seamlessly is the purpose of this invention.

6 Claims, 4 Drawing Sheets

(56) References Cited

U.S. PATENT DOCUMENTS

2008/0084836 A1* 4/2008 Baird et al. ................... 370/311
2009/0171170 A1* 7/2009 Li et al. ......................... 600/301
2012/0223808 A1* 9/2012 Friedli et al. .................. 340/5.6

* cited by examiner

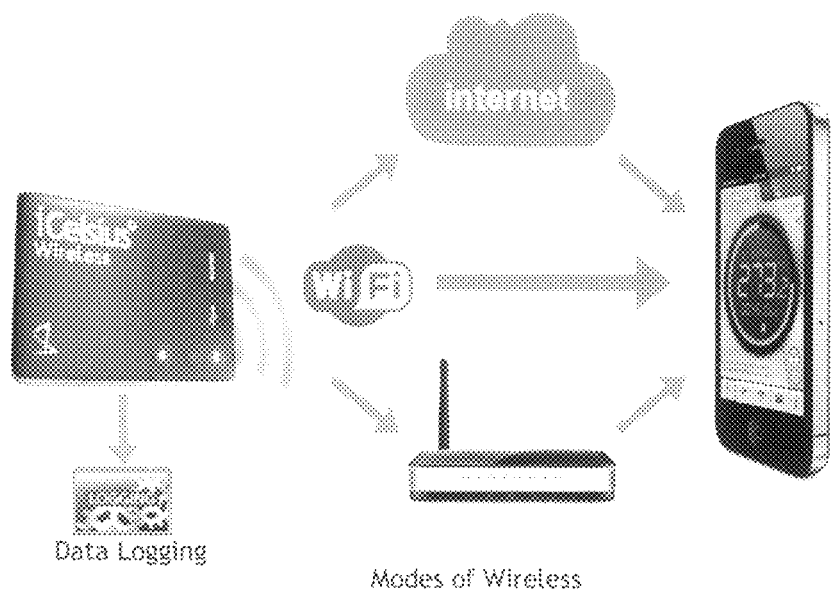
FIG. 1 Diagram illustrating the different wireless communication modes
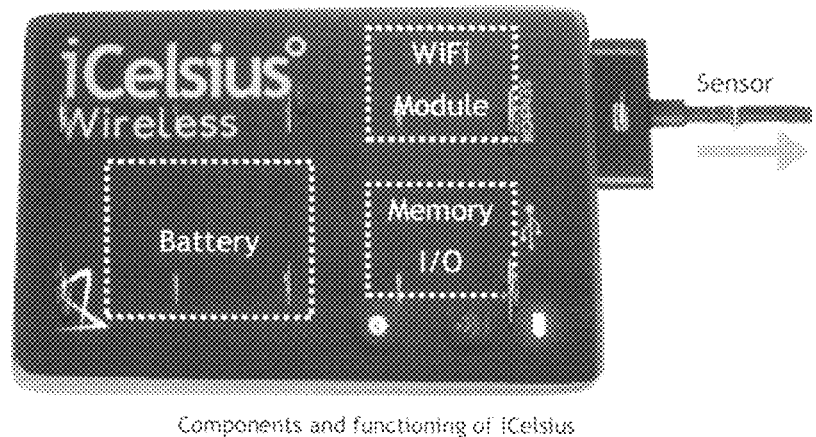
FIG. 2 Diagram of the components of the sensor device

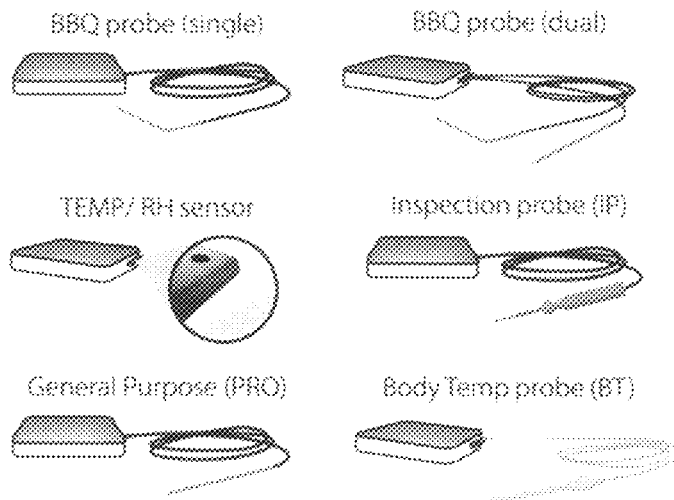
FIG. 3. Examples of probes that can be used with the iCelsius wireless
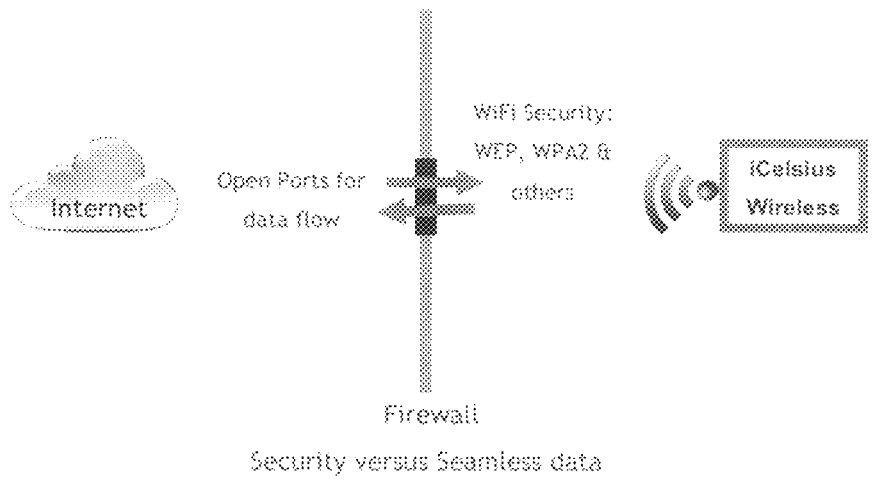
FIG. 4 An illustration of the dataflow in the network with security

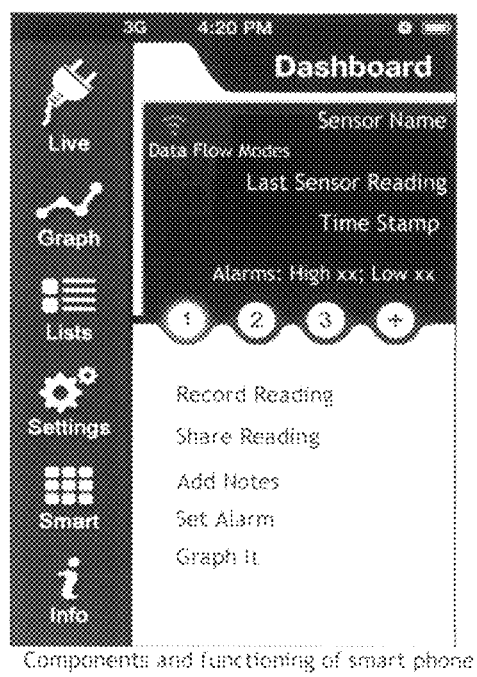
FIG. 5 Diagram of the software application running on the smart device

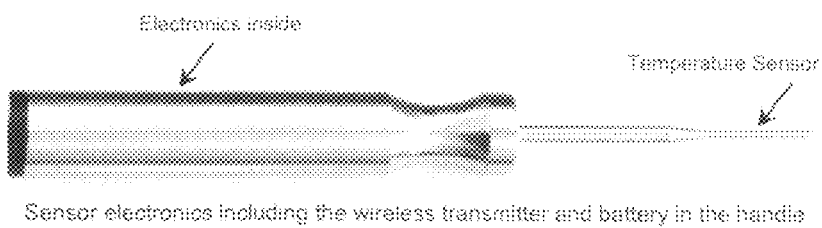
FIG. 6 Diagram of a temperature monitoring unit that has all electronics in the handle

ICELSIUS WIRELESS: WIRELESS MONITORING WITH SMART PHONES AND TABLETS

BACKGROUND OF THE INVENTION

Wireless sensors, for autonomous remote monitoring, are used extensively and their data analyzed in industrial and commercial applications for monitoring and to improve processes. Sensors are also used in consumer devices to make the particular device work better such as an accelerometer in an iPhone. However, direct use of sensors for consumer applications by the consumer is often limited to measuring and displaying a sensor readout on the sensor device such as in a temperature sensor with a digital display. Using sensors in consumer applications beyond a simple digital readout with capabilities as used in the commercial application will increase the cost of the sensor device significantly.

Wireless transmission of electromagnetic radiation communication signals has become a popular method of transmitting RF signals, such as cordless, wireless, and cellular telephone signals, pager signals, two-way radio signals, use of WiFi wireless for data transmissions in homes and offices etc. Sensors with wireless capabilities are common place while battery powered wireless sensing, though recent, have been growing because it is a more cost effective solution compared to wiring up all the sensors. There are many battery powered wireless sensors available commercially and even some of these are available for consumer applications though these wireless sensors require installing a receiver or a receiver network, which increases the cost considerably, and often times require experts to make the complete monitoring system work.

802.11 based wireless systems (also known as WiFi) are ubiquitous and routinely used to connect to the internet. A significant advantage of WiFi wireless networks compared to other wireless technologies is the widespread WiFi infrastructure in place, the much better security and availability of low cost receivers in any electronic store. However, WiFi sensors have not been common because of the high power requirements of a WiFi wireless transceiver. A battery powered WiFi transceiver will last less then 8 hours of continuous operations using a Lithium AA battery, therefore battery powered WiFi based sensors in the consumer space is rare and the few that are available have very low battery life. In recent years with some innovations low power WiFi based sensors have become available and are being used in a myriad of applications from environmental monitoring, to monitoring of freezers and refrigerators in hospitals or food storage applications, to energy monitoring. The sensors can last up to 3 years or more using a single AA Li battery with 2000 mA.Hr capacity while measuring and transmitting the sensor data wirelessly every minute. These battery powered WiFi sensors are being used in health care and food storage monitoring and few other commercial applications.

A smartphone, which is a mobile phone, with advanced computing ability, has not been a platform for sensor communications though the capability exists. Recent products such as the iCelsius convert the iPhone into a data logger for measuring temperature and relative humidity. However, these sensors are tethered to the device and not wireless. A cost effective sensor solution for consumer application with remote monitoring capability is possible by using WiFi based wireless sensors that will work with the smart phones and the cloud based computing on the internet; such an integration of these three platforms has not been achieved in such a way that the user does not have to intervene to make it all work seamlessly.

BRIEF SUMMARY OF THE INVENTION

An embodiment of the present invention provides a method and system for monitoring using low power WiFi based wireless technology that will work with smart devices; transmitting the sensor measurement to a smart phone directly or through a WiFi network or remotely through a cloud in the internet without having to configure firewall settings; displaying the information as a graph. The system is configured in such a way that the sensors can last for extended period of time using standard batteries, such as alkaline or lithium or rechargeable, available to customers. The low cost and ease of setup provides a viable solution for consumer applications.

The present invention represents a substantial advance over prior systems used for consumer applications. Because the present invention uses WiFi to connect the sensor directly to the smart phone similar to the way bluetooth devices connect to a smart phone or tablet. The user just turns on the sensor and connects the smart phone to the sensor and configures the sensor to the appropriate monitoring mode best suited for the application. These advantages, and other advantages and benefits of the present invention, will become apparent from the Detailed Description of the Invention herein below.

A system for measuring temperature using low power WiFi based wireless sensor device that will work with smart phones and tablets, the system comprising: a stainless wireless temperature sensor that includes a stainless steel sensor tip, sensor electronics embedded inside the stainless handle and the WiFi wireless electronics inside the stainless steel handle; and a battery to power the system; the smart phone or tablet for viewing of data.

BRIEF DESCRIPTION OF THE DRAWINGS

For the present invention to be clearly understood and readily practised, the present invention will be described in conjunction with the following figures, wherein:

FIG. 1 is a diagram illustrating the different wireless communication modes;

FIG. 2 is a diagram of the components of the sensor device;

FIG. 3 is a sketch of examples of iCelsius wireless units with different probes for home applications.

FIG. 4 is an illustration of the dataflow in the network with security;

FIG. 5 is a diagram of the software application running on the smart device; and FIG. 6 is a diagram of a temperature monitoring unit that has all electronics and sensor in a screw driver shaped unit; and

DETAILED DESCRIPTION OF THE INVENTION

While the present invention will be described more fully it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

First briefly in overview, the present invention according to one or more embodiments is a unique device, called iCelsius Wireless, with sensors, wireless communication system, software programs, and related business methods for sensor monitoring using low power WiFi based wireless devices that work with smart devices. The system is for home use therefore it leverages smart phones or smart devices already owned by the consumer. In addition, it has the advantage of using existing WiFi infrastructure where available as well as the internet cloud for remote monitoring.

WiFi wireless is everywhere but not as common as Bluetooth because it is not as easy to setup; but WiFi has the huge advantage of being very stable with no pairing issues and able to monitor remotely through the internet. The common challenges with WiFi devices are related to power management and usability especially when there is no display.

The current invention proposes using WiFi wireless (uses one of the ISM bands between 2.4-2.4835 GHz) for communications with the sensor. A draw back of sensors using WiFi for communication is the necessity of using an access point to communicate to a computer or a smart phone or tablet. Setting up a wireless sensor, access point and the smart phone or tablet is known to be difficult for many consumers because sensor device does not have a display; making the sensor a soft access point eliminates the need to have any external access point thereby eliminating the difficult setup procedure; so when the customer receives the sensor they have to just turn it on and connect the iPhone directly to the sensor to start monitoring.

In general, when the sensor is in the soft access point mode it can connect directly to a smart device using WiFi as is normally the case with bluetooth; the difference being that WiFi communication is stable, reliable and allows remote monitoring and avoids pairing and other problems known with blue tooth devices.

FIG. 1 illustrates the various modes of wireless communications between the iCelsius wireless and the hand held smart device. The hand held smart device could be an iPhone, iPod touch, iPad or any android based smart device or variations similar to the aforementioned devices.

All the four communications modes provide the user with a rich set of sensor capabilities that can be utilized for monitoring in a myriad of applications. For example, to use the wireless temperature sensor during a grill outdoors the first step would be to setup directly the sensor through a smart phone or tablet by making the wireless sensor a soft access point; the temperature can then be monitored with the smart phones or tablet locally or remotely with no user intervention to change from local to remote mode. For this the sensor has to be able to switch between modes automatically.

In more detail, for setup and direct communication the wireless unit broadcasts directly to the smart phone or tablet. In the low power mode for monitoring the wireless unit communicates by broadcasting to the smart phone or tablet, through a wireless access point. The broadcasting approach is unique because it eliminates the need to setup a server on the wireless sensor and then use a web browser to connect to the sensor. The user experience, with the broadcasting mode is similar to connecting a smart phone to a wireless network, therefore it improves usability.

For monitoring remotely with a smart phone or tablet the wireless unit connects to the internet cloud so as to pass the sensor data through the network using standard http type communication commonly used for browsing. FIG. 4 shows this type of communication. An advantage of using http based communication is the sensors can bypass all problems associated with port blocking. Another advantage of the sensor data flow for remote monitoring is the smart phone or tablet does not need to be in the network; the user could be anywhere and if they have a cell phone connection they can monitor the sensor live. The smart phone will behave similar to how it connects seamlessly with no user intervention when accessing the internet either via WiFi or 3G connection depending on what is available.

In a particularly preferred embodiment as shown in FIG. 2, the wireless sensor has onboard memory to save sensor data and onboard connector that has I2C, SPI and analog to digital interface to connect to any sensor probe that can connect to these interfaces.

FIG. 3 shows sketches of different probes that can be used with the iCelsius wireless communication module. The probes can be tethered using a cable with the sensor itself packaged on the cable and the other end of the cable with a connector that attaches to the wireless unit.

In this application, it is advantageous for each of the sensors to provide some form of identification allowing the software to distinguish which sensor is reporting. For remote monitoring the sensor has a destination IP address that it uses to connect the sensor data to the internet cloud. The dataflow is using http header which has the advantage of using standard ports that are typically not blocked via firewalls. A distinct advantage with this type of communication is the user does not have to intervene for remote monitoring as the iCelsius Wireless unit selects the appropriate method to get the sensor data to the smart device.

FIG. 5. shows an example of user interface on a smart phone for visualization of the sensor data. The sensor information and processed sensor information may be made available on the smart phone or tablet or on the internet through a Web server application. In one embodiment, a web application may be provided offering access to information for monitoring purposes. The application may respond to web client requests for sensor information. Alternatively, alerts can be provided based on predefined set of rules.

Another embodiment of the invention the iCelsius wireless can be packaged as shown in FIG. 6. The electronics is completely packaged with the sensor probe with no need for tether or cables. Such a hand held device is easy to carry and it includes a battery and a single push button to switch between the direct wireless mode wherein the sensor connects to the smart phone or tablet directly, or indirectly through a wireless access point.

What is claimed is:

1. A system for monitoring using low power WiFi based wireless sensor device for cooking, health and home environment applications that will work with smart phones and tablets, the system comprising:
    WiFi wireless sensor device for detection or sensing temperature, relative humidity, indoor air quality, leak detection and water quality;
    the smart phone or tablet for provisioning;
    a wireless network with external access points for remote monitoring;
    provisioning of the wireless sensor by making the wireless sensor into a WiFi access point connecting to a server in the cloud and passing the sensor data to a smart phone or, configuring the wireless sensor for monitoring;

activating sensors to make measurements periodically or continuously;

extracting the sensor data to a smart phone or tablet remotely through a server in the internet cloud; and wherein the wireless sensor has onboard memory to save sensor data and an onboard connector that includes I2C, SPI, and analog to digital interfaces to connect to sensor probes that can connect to these interfaces with auto-detection of the type of sensor probe by the wireless sensor device.

2. The system of claim 1 wherein the sensor data measured by the WiFi wireless sensor device is transmitted using 802.11 with security via a WiFi access point to the internet cloud on to the smart phone or tablet.

3. The system of claim 1 wherein the wireless sensor is a battery powered device that can last up to 3 years and for the purpose of provisioning and longer term monitoring uses a rechargeable battery of 2000 mAhr or lower.

4. The system of claim 1 wherein the wireless sensor firmware is updated over the air with no user intervention, through a server in the cloud.

5. A system of communication for battery powered WiFi sensors that will work with smart phones and tablets, the system comprising:

wireless sensors broadcasting as a soft access point with a push of a button;

a smart phone or tablet to connect to a wireless sensor set as an access point;

wireless sensors that are programmed, configured and controlled during provisioning through a smart phone or tablet through an APP;

wireless sensors can be set in the data logging mode and activated for monitoring with the smart phones or tablet through a server in the cloud with no user intervention; and wherein the wireless sensor has onboard memory to save sensor data and an onboard connector that includes I2C, SPI, and analog to digital interfaces to connect to sensor probes that can connect to these interfaces with auto-detection of the type of sensor probe by the wireless sensor device.

6. The system of claim 5 wherein wireless sensors are activated in the low power mode for monitoring using http type of communication from the sensor with no server to a server in the cloud, bypassing port blocks.

* * * * *